US010083495B2

United States Patent
Goodman et al.

(10) Patent No.: US 10,083,495 B2
(45) Date of Patent: Sep. 25, 2018

(54) MULTI-PROCESSOR SYSTEM AND OPERATIONS TO DRIVE DISPLAY AND LIGHTING FUNCTIONS OF A SOFTWARE CONFIGURABLE LUMINAIRE

(71) Applicant: ABL IP HOLDING LLC, Conyers, GA (US)

(72) Inventors: Jonathan Lloyd Goodman, Herndon, VA (US); Hampton Boone Maher, Washington, DC (US); Ravi Komanduri, Dulles, VA (US); Rashmi Kumar Raj, Herndon, VA (US)

(73) Assignee: ABL IP HOLDING LLC, Conyers, GA (US)

( * ) Notice: Subject to any disclaimer, the term of this patent is extended or adjusted under 35 U.S.C. 154(b) by 103 days.

(21) Appl. No.: 15/211,272

(22) Filed: Jul. 15, 2016

(65) Prior Publication Data

US 2018/0018749 A1   Jan. 18, 2018

(51) Int. Cl.
*G06T 1/20* (2006.01)
*G09G 3/34* (2006.01)
*G09G 5/02* (2006.01)

(52) U.S. Cl.
CPC .............. *G06T 1/20* (2013.01); *G09G 3/342* (2013.01); *G09G 3/3406* (2013.01); *G09G 3/348* (2013.01); *G09G 5/02* (2013.01); *G09G 2320/0626* (2013.01); *G09G 2320/0666* (2013.01); *G09G 2360/06* (2013.01)

(58) Field of Classification Search
None
See application file for complete search history.

(56) References Cited

U.S. PATENT DOCUMENTS

| 8,344,410 | B2 | 1/2013 | Wendler et al. |
| 8,441,503 | B2 | 5/2013 | Isobe et al. |
| 8,467,887 | B2 | 6/2013 | Jung et al. |
| 8,836,243 | B2 | 9/2014 | Eisele et al. |
| 9,084,305 | B2 | 7/2015 | Toda et al. |
| 9,642,209 | B2 | 5/2017 | Eisele et al. |
| 9,880,328 | B2 * | 1/2018 | Gollier ................ G02B 5/0278 |
| 2003/0169248 | A1 * | 9/2003 | Kim .................... G09G 3/3611 |
| | | | 345/204 |
| 2004/0160199 | A1 | 8/2004 | Morgan et al. |

(Continued)

OTHER PUBLICATIONS

"For Windows Advertising All Around the World," NEXNOVO®, Transparent Digital Poster, Nexnovo Technology Co, Ltd, www.nexnovo.com, © 2016 Nexnovo Technology Co, Ltd, Shenzhen, China, downloaded Oct. 13, 2016.

(Continued)

*Primary Examiner* — Joni Richer
(74) *Attorney, Agent, or Firm* — RatnerPrestia

(57) ABSTRACT

The examples relate to various implementations of a software configurable lighting device having a multi-processor system including a central processing unit and a parallel processing unit. The software configurable lighting device utilizes the multi-processor system to efficiently transform and/or modify control data. The software configurable lighting device also includes a transparent image display device and a general illumination device. Transformed and/or modified control data is utilized to drive the transparent image display device and the general illumination device in combination.

28 Claims, 9 Drawing Sheets

(56) References Cited

U.S. PATENT DOCUMENTS

| | | | |
|---|---|---|---|
| 2005/0093783 A1 | 5/2005 | Lau et al. | |
| 2007/0294665 A1* | 12/2007 | Papakipos | G06F 8/45 717/119 |
| 2008/0272623 A1* | 11/2008 | Kadzban | B60J 7/00 296/216.01 |
| 2010/0079361 A1 | 4/2010 | Lee et al. | |
| 2010/0225986 A1* | 9/2010 | Missbach | G02B 26/005 359/228 |
| 2011/0063201 A1* | 3/2011 | Karrenbauer | G09G 3/3426 345/102 |
| 2012/0154370 A1* | 6/2012 | Russell | G09G 3/346 345/214 |
| 2013/0329994 A1* | 12/2013 | Webb | G09G 5/02 382/167 |
| 2014/0043352 A1* | 2/2014 | Damberg | H04N 9/3147 345/589 |
| 2015/0192728 A1* | 7/2015 | Thompson | G02B 6/0043 362/624 |
| 2016/0063951 A1* | 3/2016 | Ikizyan | G09G 5/02 345/590 |
| 2016/0378062 A1* | 12/2016 | Watanabe | G03H 1/0808 359/9 |

OTHER PUBLICATIONS

Non Final Office Action for U.S. Appl. No. 15/357,143, dated Apr. 9, 2018, 18 pages.

* cited by examiner

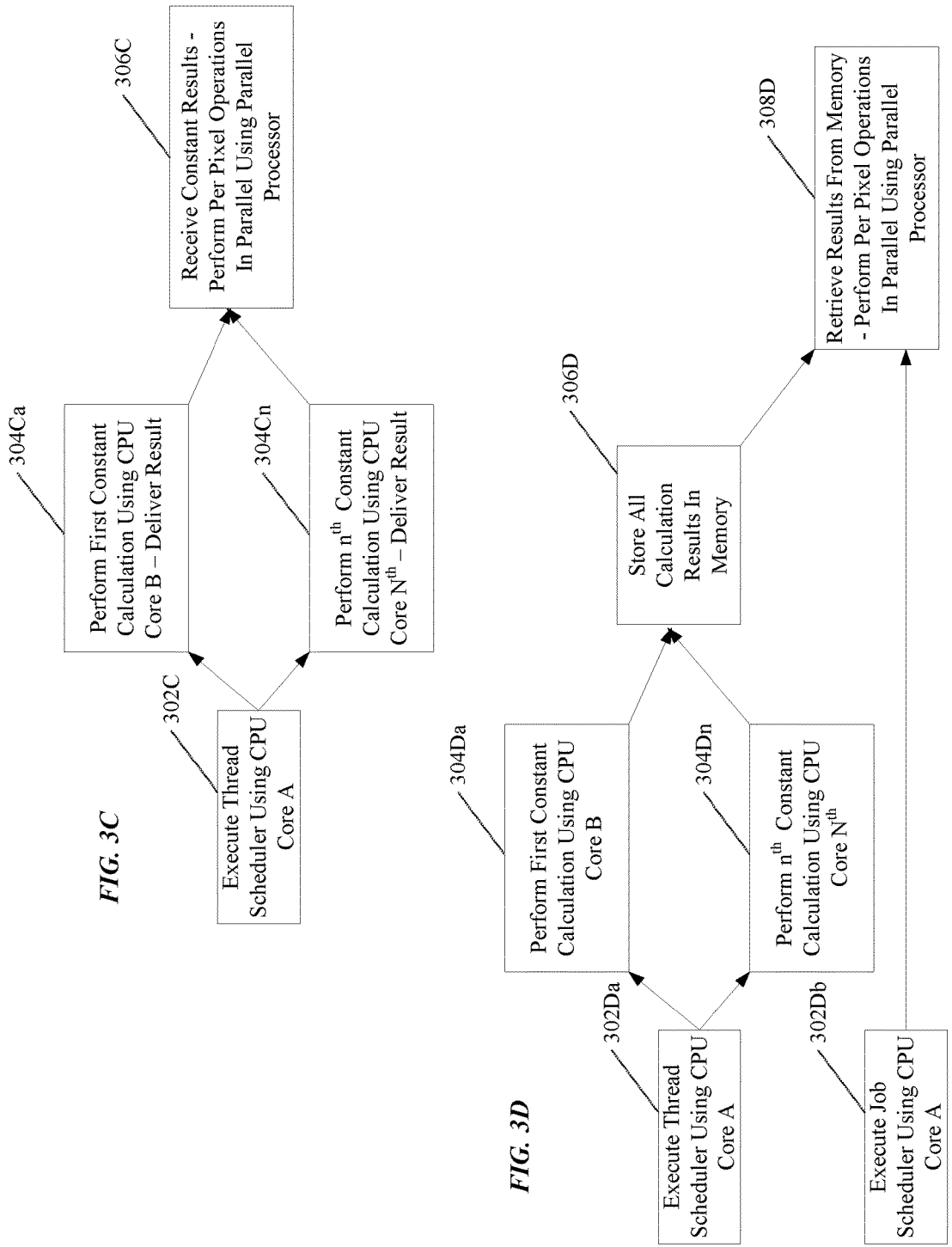

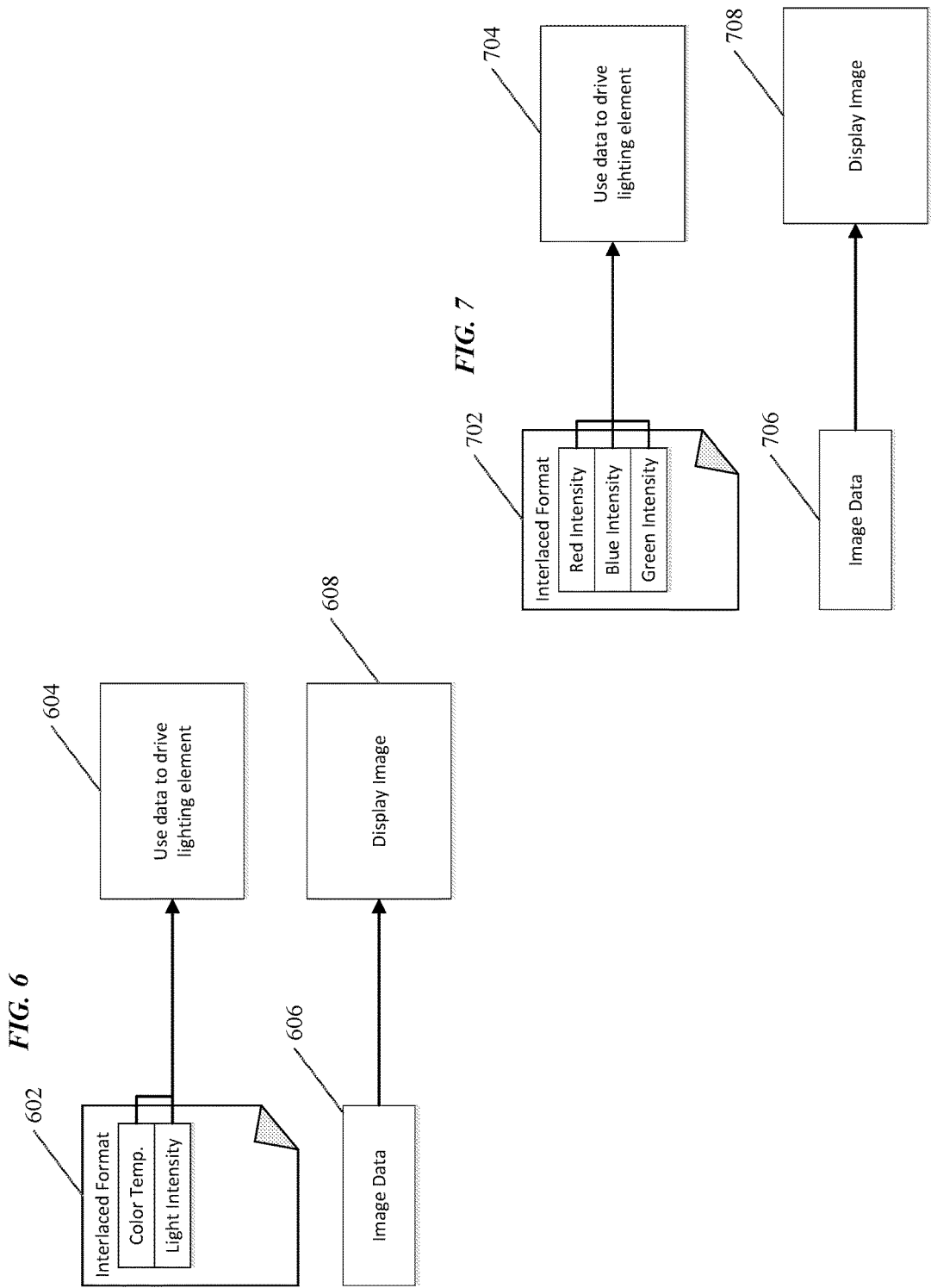

MULTI-PROCESSOR SYSTEM AND OPERATIONS TO DRIVE DISPLAY AND LIGHTING FUNCTIONS OF A SOFTWARE CONFIGURABLE LUMINAIRE

TECHNICAL FIELD

The present subject matter relates to a software configurable lighting device or luminaire, e.g. that uses a multi-processor system, and to approaches for distributing various processing tasks between different processors of a multi-processor system of a software configurable lighting device or luminaire.

BACKGROUND

Electrically powered artificial lighting has become ubiquitous in modern society. Electrical lighting devices are commonly deployed, for example, in homes, buildings of commercial and other enterprise establishments, as well as in various outdoor settings.

In conventional lighting devices, the luminance output can be turned ON/OFF and often can be adjusted up or dimmed down. In some devices, e.g. using multiple colors of light emitting diode (LED) type sources, the user may be able to adjust a combined color output of the resulting illumination. The changes in intensity or color characteristics of the illumination may be responsive to manual user inputs or responsive to various sensed conditions in or about the illuminated space.

There have been proposals to use displays or display-like devices mounted in or on the ceiling to provide lighting. The Fraunhofer Institute, for example, has demonstrated a lighting system using luminous tiles, each having a matrix of red (R) LEDs, green (G), blue (B) LEDs and white (W) LEDs as well as a diffuser film to process light from the various LEDs. The LEDs of the system were driven to simulate or mimic the effects of clouds moving across the sky. Although use of displays allows for variations in appearance that some may find pleasing, the displays or display-like devices are optimized for image output and do not provide particularly good illumination for general lighting applications. Liquid crystal displays (LCD) also are rather inefficient and thus not readily adaptable to artificial illumination applications. Even if display or display like devices may be adapted in some fashion for use as artificial illumination, operating such a device to provide a display capability and associated general lighting performance may place high demands on the data processing capabilities of the device. As the resolution of the device increases, the data processing demands increase and there is room for further improvement in the processor architecture and operations in increasingly sophisticated luminaries.

SUMMARY

An example of configurable luminaire as disclosed herein includes a display configured to present an image, a controllable, general illumination, light source collocated with the display, a driver system, and a multi-processor system. The driver system is coupled to the controllable, general illumination, light source to control light generation for general illumination. The driver system is also coupled to the display to control presentation of an image. The multi-processor system is coupled to the driver system and comprises a central processing unit and a parallel processing unit. The multi-processor system is configured to obtain data related to operation of the configurable luminaire. The central processing unit is configured to perform a calculation based on the obtained data. The parallel processing unit is configured to perform a plurality of operations in parallel wherein each operation corresponds to a portion of the obtained data, each operation comprises at least one task to be performed based on the corresponding portion of the obtained data and a result of the calculation performed by the central processing unit, and the plurality of operations result in modified data. The multi-processor system is further configured to control operation of the driver system, based on the modified data, including to: (1) control light generated by the light source and (2) control the presentation of the image via the display.

Some of the described examples disclose a method including obtaining, by a multi-processor system of a configurable luminaire, data related to operation of the configurable luminaire. The method further includes performing, by a central processing unit of the multi-processor system, a calculation based on the obtained data. The method also includes performing, by a parallel processing unit of the multi-processor system, a plurality of operations in parallel wherein each operation corresponds to a portion of the obtained data, each operation comprises at least one task to be performed based on the corresponding portion of the obtained data and a result of the calculation performed by the central processing unit, and the plurality of operations resulting in modified data. As part of the method, the multi-processor system controls operation of a driver system of the configurable luminaire, based on the modified data, including to: (1) control light generated by a light source of the configurable luminaire and (2) control the presentation of an image via a display of the configurable luminaire.

Additional objects, advantages and novel features of the examples will be set forth in part in the description which follows, and in part will become apparent to those skilled in the art upon examination of the following and the accompanying drawings or may be learned by production or operation of the examples. The objects and advantages of the present subject matter may be realized and attained by means of the methodologies, instrumentalities and combinations particularly pointed out in the appended claims.

BRIEF DESCRIPTION OF THE DRAWINGS

The drawing figures depict one or more implementations in accord with the present concepts, by way of example only, not by way of limitations. In the figures, like reference numerals refer to the same or similar elements.

FIGS. 3A-3D are examples of various high-level process flows implemented by a multi-processor system, such as used in the software configurable luminaire of FIG. 1.

FIGS. 4-7 illustrate examples of various approaches for managing and interpreting interlaced data.

DETAILED DESCRIPTION

Figure 1:
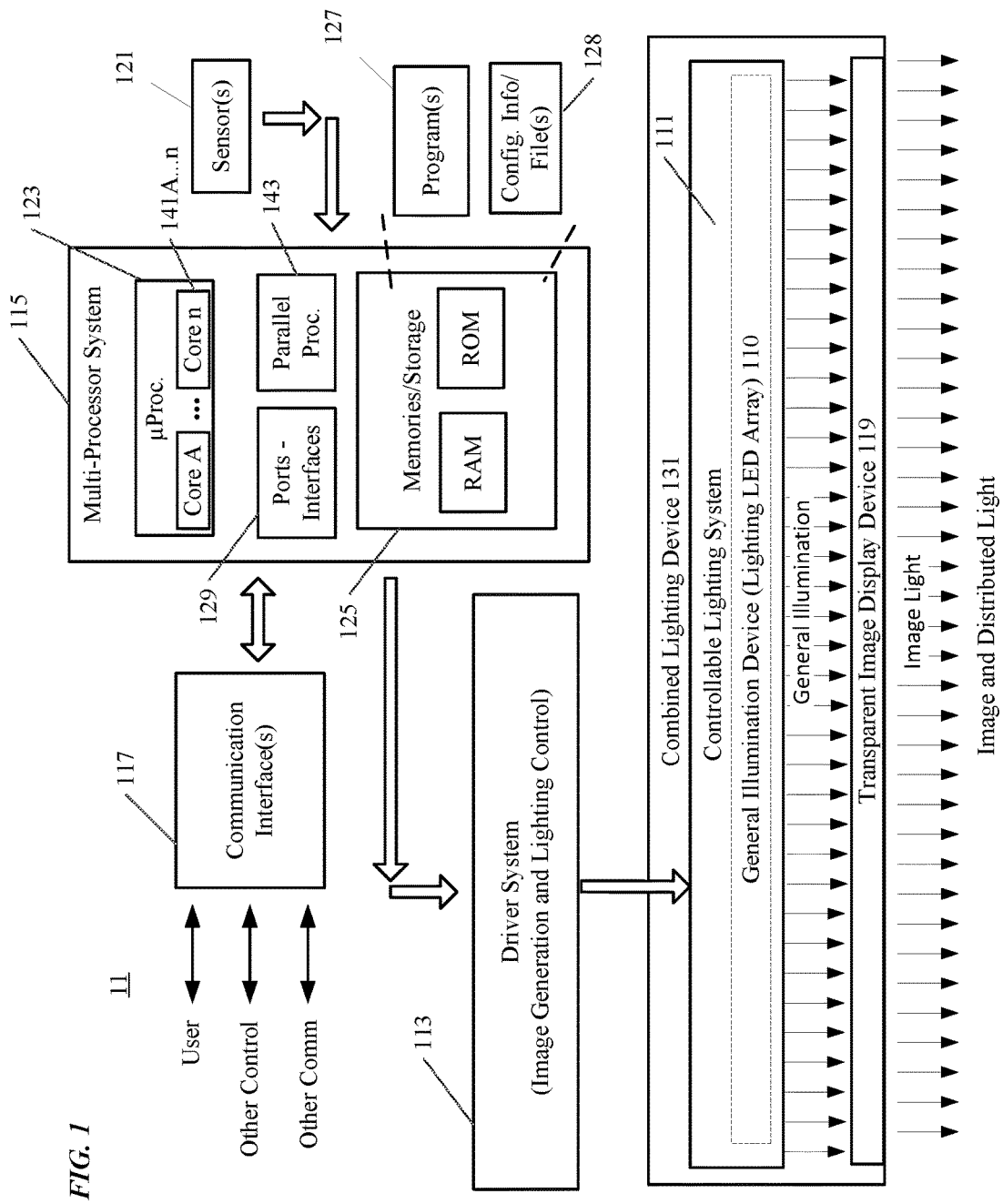
FIG. 1 is high-level functional block diagram of an example of a software configurable luminaire with a multi-processor system, for example, including a multi-threaded central processing unit and a parallel processing unit.

In the following detailed description, numerous specific details are set forth by way of examples in order to provide a thorough understanding of the relevant teachings. However, it should be apparent to those skilled in the art that the present teachings may be practiced without such details. In other instances, well known methods, procedures, components, and/or circuitry have been described at a relatively high-level, without detail, in order to avoid unnecessarily obscuring aspects of the present teachings.

Applicant has recently developed proposals directed to luminaries utilizing transparent image displays that allow an image to be displayed while remaining at least partially transparent. In particular, such a transparent image display is collocated with a general illumination device, and illumination generated by the general illumination device "passes through" the transparent image display. In such a combined lighting device, image data related to an image to be displayed by the transparent image display may need to be transformed; and/or control data related to illumination generation may need to be modified such that the produced image and the generated illumination have a desired result.

However, while non-parallel processors typical of traditional lighting devices may be well suited to perform portions of the image transformation and/or control data modification, such serialized processors are inefficient for performing identical operations repetitively on multiple sets of data, as required by other portions of the image transformation and/or control data modification. As such, typical non-parallel processors are not optimal for concurrently controlling image display and a general illumination functions when both are implemented in a lighting device.

Various examples described in detail below and shown in the drawings implement enhancements to existing display technologies to provide the dual functionality of a display and luminaire, particularly in a manner to more effectively support luminaire type general lighting applications. In one such example, a combined lighting device includes a transparent image display device and a controllable lighting system. However, due to the additive nature of light, an image selection to be displayed by the image display device may need to be transformed and/or a general illumination generation selection may need to be modified. Therefore, such combined lighting device and/or related components within a luminaire is configured, for example, to transform an image selection and/or modify a general illumination generation selection such that output of the transparent image display device produces a desired image and illumination generated by the controllable lighting system appropriately illuminates a space.

However, portions of such image transformation and illumination modification are more efficiently performed in a parallel fashion while other portions are well suited to be performed in a serial fashion. As such, in one example, a combined lighting device also includes a multi-processor system. In this example, the multi-processor system includes both a central processing unit and a parallel processing unit. The parallel processing unit is, for example, a graphics processing unit, a field programmable gate array or an application specific integrated circuit. In a further example, the central processing unit includes multiple cores and/or is otherwise enabled to process multiple simultaneous threads.

A software configurable lighting device, installed for example as a panel, offers the capability to emulate a variety of different lighting devices while presenting any desired appearance via image display. The operation of such software configurable lighting device is enhanced by the use of a multi-processor system configured to perform, by a parallel processor, calculations well suited for parallel processing and to perform, by a central processing unit, other calculations.

Reference now is made in detail to the examples illustrated in the accompanying drawings and discussed below. As shown in FIG. 1, the controllable lighting system 111 provides general illumination lighting via general illumination device 110 in response to lighting control signals received from the driver system 113. Similarly, the transparent image display device 119 provides image light in response to image control signals received from the driver system 113. In addition or alternatively, the image data may be provided to the image display device 119 from an external source(s) (not shown), such as a remote server or an external memory device via one or more of the communication interfaces 117. The elements 111, 110 and 119 are collocated to form combined lighting device 131 and are controlled by the respective control signals received from the driver system 113.

The transparent image display device 119 may be either a commercial-off-the-shelf image display device or an enhanced transparent image display device (described in more detail in the following examples) that allows general illumination lighting generated by general illumination device 110 to pass through. The general illumination lighting alone or in combination with light output from the display illuminates a space in compliance with governmental building codes and/or industry lighting standards. The image display device 119 is configured to present an image. The presented image may be a real scene, a computer generated scene, a single color, a collage of colors, a video stream, or the like.

In several examples, the general illumination device 110 includes a lighting LED array configured to provide light for the general illumination function. The controllable lighting system 111 is collocated with the image display device 119 to form a combined lighting device 131. However, as mentioned above and discussed in greater detail below, image display and general illumination generation are often conflicting functions that, when performed by combined lighting device 131, require modification and transformation to produce acceptable results.

In one example of the operation of the lighting device, the multi-processor system 115 receives a configuration file 128 via one or more of communication interfaces 117. The multi-processor system 115 may store, or cache, the received configuration file 128 in storage/memories 125. The configuration file 128 includes data related to operation of the configurable lighting device that indicates, for example, an image for display by the image display device 119 (e.g., image pixel data representing points of the image) as well as a general lighting generation selection (e.g., control data controlling intensity of general illumination). A general lighting generation selection includes, for example, lighting settings for light to be provided by the controllable lighting system 111. Using the indicated image data, the multi-processor system 115 may retrieve from memory 125 stored image data and, based on a desired color characteristic distribution consistent with the lighting settings of the general lighting generation selection, transform image data to produce transformed image data. That is, as discussed in greater detail below, the image selection is transformed such that an output of the image display device 119, in combination with light generated by the controllable lighting system 111, results in a desired image and desired general illumination. The transformed image data is then delivered to the driver system 113.

The driver system 113 may deliver the transformed image data directly to the image display device 119 for presentation or may have to convert the image data into a format suitable for delivery to the image display device 119. For example, the transformed image data may be video data formatted according to compression formats, such as H.264 (MPEG-4 Part 10), HEVC, Theora, Dirac, RealVideo RV40, VP8, VP9, or the like, and still transformed image data may be formatted according to compression formats such as Portable Network Group (PNG), Joint Photographic Experts Group (JPEG), Tagged Image File Format (TIFF) or exchangeable image file format (Exif) or the like. For example, if floating point precision is needed, options are available, such as OpenEXR, to store 32-bit linear values. In addition, the hypertext transfer protocol (HTTP), which supports compression as a protocol level feature, may also be used.

Each general lighting generation selection includes software control data to set the light output parameters of the software configurable lighting device at least with respect to the controllable lighting system 111. As mentioned, the configuration information in the file 128 may specify operational parameters of the controllable lighting system 111, such as light intensity, light color characteristic and the like, as well as the operating state of any light processing and modulation components of the controllable lighting system 111. The multi-processor 115 by accessing programming 127 and using software configuration information 128, from the storage/memories 125, modifies operational parameters of the general lighting generation selection based on the transformed image data to create a modified general lighting generation selection. The multi-processor system 115 controls, based on the modified general lighting generation selection, operation of the driver system 113, and through that system 113 controls the controllable lighting system 111. For example, the multi-processor system 115 obtains light intensity distribution control data as part of the general lighting generation selection from the configuration file 128. In turn, multi-processor system 115 modifies the obtained light intensity distribution control data of the general lighting generation selection based on transformed image data to be displayed by transparent image display device 119. Next, multi-processor system 115 uses that modified control data to control the driver system 113 to set operating states of the light processing and modulation components of the controllable lighting system 111. For example, driver system 113 drives controllable lighting system 111 to control output of general illumination device 110 to produce a selected distribution of varying intensities of LEDs within general illumination device 110, e.g. to achieve a predetermined light generation for a general illumination application of a luminaire.

In other examples, the driver system 113 is coupled to the memory 125, the image display device 119 and the controllable lighting system 111 to control light generated by the image display device 119 and the controllable lighting system 111 based on the configuration data 128 stored in the memory 125. In such an example, the driver system 113 is configured to access configuration data 128 stored in the memory 125 and generate control signals for presenting a transformed image on the image display device 119 and control signals based on a modified general lighting generation selection for generating light for output from the general illumination device 110. For example, the image display device 119 includes inputs coupled to the driver system 113 for receiving image data according to the configuration data 128 stored in the memory. Examples of the image data includes video data or still image data stored in the memory 125. The driver system 113 may also deliver control signals for presenting the image on the image display device 119 that are generated based on the received image data.

The first drawing also provides an example of an implementation of the high layer logic and communications elements and one or more drivers to drive the combined lighting device 131 to provide a selected distribution of light intensities, e.g. for a general illumination application. As shown in FIG. 1, the lighting device 11 includes a driver system 113, a multi-processor system 115, one or more sensors 121 and one or more communication interface(s) 117.

The multi-processor system 115 provides the high level logic or "brain" of the device 11. In the example, the multi-processor system 115 includes data storage/memories 125, such as a random access memory and/or a read-only memory, as well as programs 127 stored in one or more of the data storage/memories 125. Such programs 127 include, for example, instructions necessary to perform transformation of an image selection and/or modification of a general lighting generation selection. The data storage/memories 125 store various data, including lighting device configuration information 128 or one or more configuration files containing such information, in addition to the illustrated programming 127. The multi-processor system 115 also includes a central processing unit (CPU), shown by way of example as a microprocessor (µP) 123, although other processor hardware may serve as the CPU. In addition, multi-processor system 115 includes a parallel processor 143.

CPU 123 includes, for example, multiple cores A-n 141A-n. Although CPU 123 is depicted with multiple cores, this is only for example and no such requirement exists. Alternatively, CPU 123 may be a single processor with a single core. In various examples, CPU 123 supports multiple threads where each thread represents an independent processing path. For example, each core A-n 141A-n of CPU 123 supports one or more threads of processing. Similarly, a single core processor may also support multiple threads. In various examples, CPU 123 is configured to perform serialized tasks. That is, a first task is performed first and a second task, independent of the first task, is performed second. In some examples, the first task is performed by one core of CPU 123 while the second task is performed by another core of CPU 123. In other words, even though the tasks are serialized and independent, multiple tasks may be performed during a single processing cycle by use of multiple cores or multiple threads. Said another way, given multiple processing cores or a single multi-threaded core, multiple different independent serialized tasks may be performed simultaneously.

In contrast to CPU 123 which is configured to perform serialized tasks, parallel processor 143 is configured to perform a plurality of operations during a same processing cycle. For example, given a number of data points and the same processing to be performed for each data point, parallel processor 143 performs that same processing on the number of data points at the same time or otherwise in parallel. As a further example, image data and/or control data for general illumination may be divided into various portions, with each portion corresponding to a pixel (e.g., an image pixel and/or an illumination pixel). In order to transform the image data and/or modify the control data, each portion of data corresponding to a pixel must be processed in the same way. Instead of processing data corresponding to a first pixel and then processing data corresponding to a second pixel, as might be done in the serialized fashion of CPU 123, parallel processor 143 performs the same processing on each portion during the same processing cycle. As a result, the entire image data is transformed and/or all of the control data is modified during the same processing cycle, thereby improving efficiency of multi-processor system 115. Parallel processor 143 is, for example, a graphics processing unit (GPU), a field programmable gate array (FPGA) or an application specific integrated circuit (ASIC). In a further example, the GPU includes a number of tile-based processors or stream-based processors.

In FIG. 1, the ports and/or interfaces 129 couple the multi-processor system 115 to various elements of the device 11 logically outside the multi-processor system 115, such as the driver system 113, the communication interface(s) 117 and the sensor(s) 121. For example, the multi-processor system 115 by accessing programming 127 in the memory 125 controls operation of the driver system 113 and other operations of the lighting device 11 via one or more of the ports and/or interfaces 129. In a similar fashion, one or more of the ports and/or interfaces 129 enable the multi-processor system 115 to use and communicate externally via the interfaces 117; and the one or more of the ports 129 enable the multi-processor system 115 to receive data regarding any condition detected by a sensor 121, for further processing.

In the examples, based on its programming 127, the multi-processor system 115 processes data retrieved from the memory 125 and/or other data storage, and responds to light output parameters in the retrieved data to control the combined lighting device 131. The light output control also may be responsive to sensor data from a sensor 121. The light output parameters may include light intensity and light color characteristics in addition to spatial modulation (e.g. steering and/or shaping and the like for achieving a desired spatial distribution).

As noted, the multi-processor system 115 is coupled to the communication interface(s) 117. In the example, the communication interface(s) 117 offer a user interface function or communication with hardware elements providing a user interface for the device 11. The communication interface(s) 117 may communicate with other control elements, for example, a host computer of a building control and automation system (BCAS). The communication interface(s) 117 may also support device communication with a variety of other systems of other parties, e.g. the device manufacturer for maintenance or an on-line server for downloading of virtual luminaire configuration data.

As outlined earlier, the multi-processor system 115 also is coupled to the driver system 113. The driver system 113 is coupled to the combined lighting device 131 to control one or more operational parameter(s) of the light output generated by the controllable lighting system 111. Although the driver system 113 may be a single integral unit or implemented in a variety of different configurations having any number of internal driver units, the example of system 113 may include a separate general illumination device driver (not shown) and a separate image display driver (not shown). The separate drivers may be circuits configured to provide signals appropriate to the respective type of light source and/or modulators of the combined lighting device 131 utilized in the particular implementation of the device 11, albeit in response to commands or control signals or the like from the multi-processor system 115.

The multi-processor system 115 and the driver system 113 provide a number of control functions for controlling operation of the lighting device 11. In a typical example, execution of the programming 127 by the multi-processor system 115 and associated control via the driver system 113 configures the lighting device 11 to perform functions, including functions to operate the general illumination device 110 to provide light output from the lighting device and to operate the controllable lighting system 111 to steer and/or shape the light output from the source so as to distribute the light output from the lighting device 11 to emulate a lighting distribution of a selected one of a number of types of luminaire, based on the lighting device configuration information 128.

Apparatuses implementing functions like those of device 11 may take various forms. In some examples, some components attributed to the lighting device 11 may be separated from the combined lighting device 131. For example, an apparatus may have all of the above hardware components on a single hardware device as shown or in different somewhat separate units. In a particular example, one set of the hardware components may be separated from the combined lighting device 131, such that the multi-processor system 115 may run several similar systems of sources and modulators from a remote location. Also, one set of intelligent components, such as the multi-processor system 115, may control/drive some number of driver systems 113 and associated combined lighting devices 131. It also is envisioned that some lighting devices may not include or be coupled to all of the illustrated elements, such as the sensor(s) 121 and the communication interface(s) 117. For convenience, further discussion of the device 11 of FIG. 1 will assume an intelligent implementation of the device that includes at least the illustrated components.

In addition, the device 11 is not size restricted. For example, each device 11 may be of a standard size, e.g., 2-feet by 2-feet (2×2), 2-feet by 4-feet (2×4), or the like, and arranged like tiles for larger area coverage. Alternatively, the device 11 may be a larger area device that covers a wall, a part of a wall, part of a ceiling, an entire ceiling, or some combination of portions or all of a ceiling and wall.

Lighting equipment like that disclosed in the examples of FIG. 1 may be used in combinations of an image display device and other light sources, e.g. as part of the same fixture for general illumination, but not part of or integrated into the image display device. Although the image display device and general illumination device may be of any of the various respective types described here, for discussion purposes, we will use an example of a fixture that has an image display combined with a general illumination device, i.e., a controllable additional light source. For this purpose, 1A illustrates examples of components to be included in a combined lighting device 131.

Figure 1A:
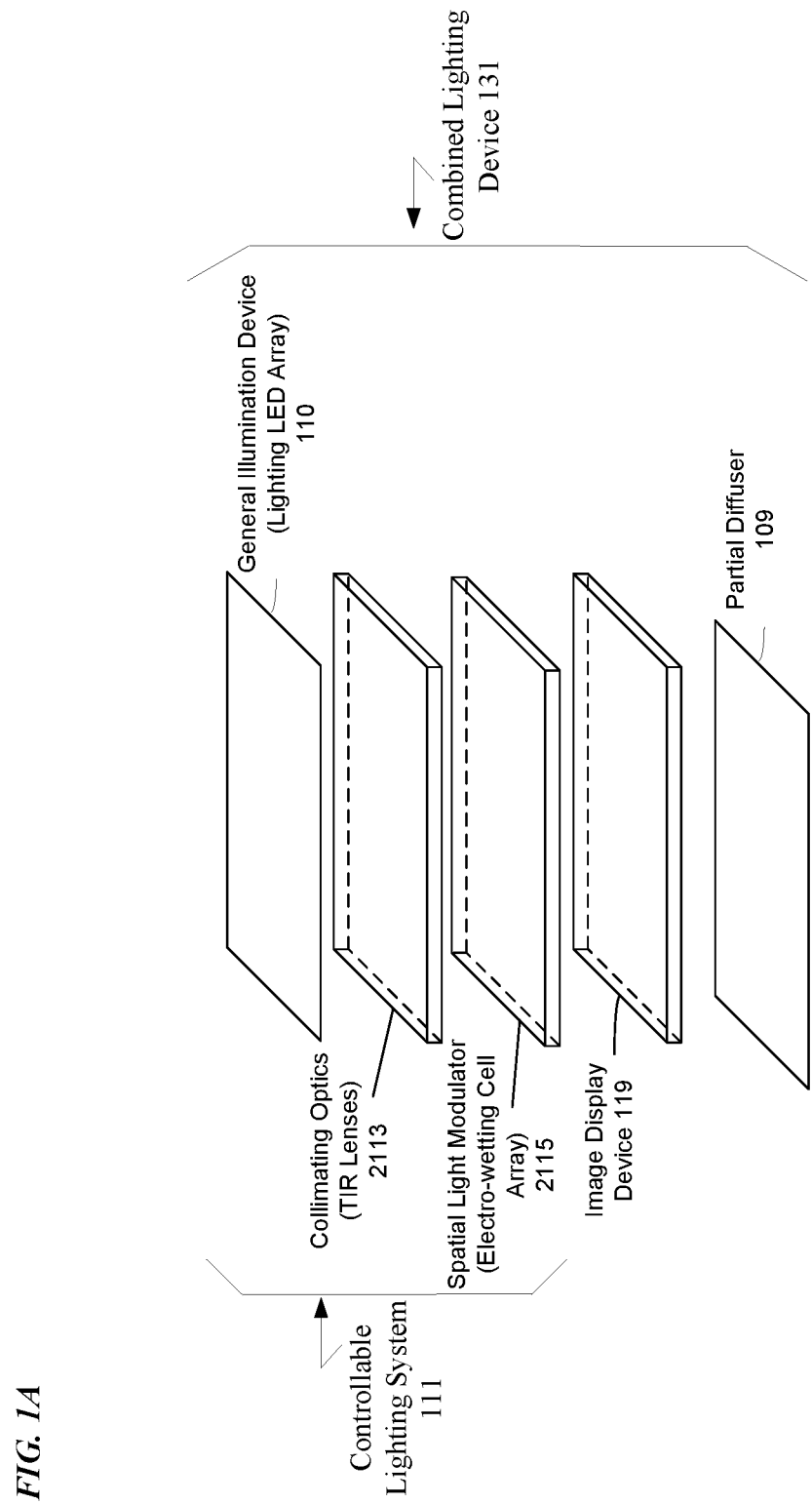
FIG. 1A is an illustration of components of an enhanced controllable lighting system, such as may be used in the software configurable luminaire of FIG. 1.

In the example of FIG. 1A, combined lighting device 131 includes controllable lighting system 111 and image display device 119. The combined lighting device 131 optionally includes partial diffuser 109 placed so as to cover image display device 119 and partially diffuse light generated by both image display device 119 and controllable lighting system 111. In one example, partial diffuser 109 is a holographic type where the diffusion angle can be controlled to be a few degrees, such that the lighting distribution is not significantly affected by it, but at the same time can hide some features of the layers behind it that would otherwise be more visible since the display layer is partially transparent.

Controllable lighting system 111 includes general illumination device 110. In one example, general illumination device 110 includes an array of LEDs configured to emit light for general illumination within a space. In the example of FIG. 1A, the controllable lighting system 111 also optionally includes collimating optics 2113 and/or spatial light modulator 2115. Collimating optics 2113 is formed, for example, with a collection of total internal reflection (TIR) lenses. Collimating optics 2113 enable light emitted by general illumination display 110 to be coupled more efficiently to transparent regions of image display device 119 and/or spatial light modulator 2115. Spatial light modulator 2115 is, for example, an electro-wetting cell array. Spatial light modulator 2115 enables light emitted by general illumination device 110, and optionally collimated by collimating optics 2113, to be shaped and/or steered for general illumination within a space.

As noted with regard to FIG. 1A, the controllable lighting system 111 may also include a controllable spatial light modulator 2115 for processing the emitted light according to the modified general lighting generation selection. To explain in more detail by way of example, the controllable lighting system 111 may receive control signals from the driver system 113 that control beam steering/beam shaping by spatial light modulator 2115 to process light with a particular beam steering and/or beam shaping process to provide a desired spatial distribution of general illumination.

As shown in the cross-sectional view of FIG. 1A, each of the controllable lighting systems 111 is formed by a general illumination display 110 optionally in combination with collimating optics 2113 and/or a spatial light modulator 2115. Each combination of a general illumination display 110, collimating optics 2113 and a spatial light modulator 215 operates and is controlled essentially as described by way of example above, to produce a distributed light output suitable for general illumination.

In the example of FIGS. 1 and 1A, the image light and/or general illumination light from the image display device 119 provides an image visible to a person within the space in which the lighting device 11 is installed. The intensity and/or color characteristics of the image and/or light output of the image display device 119 may be selectively controlled, however, there is no direct spatial modulation of image light. Light, however, is additive. The light output of controllable lighting system 111 is selectively modulated. Hence, in an example like that shown in FIGS. 1 and 1A, the combination of light from the image display and light from the controllable lighting system 111 can be controlled to emulate a lighting distribution of a selected one of a variety of different luminaries. More specifically, an image to be displayed is transformed based on a desired color characteristic distribution while general lighting generation control data is modified based on the transformed image such that the combination of the display of the transformed image and general illumination produced by the modified control data provides a desired result. In addition, data necessary to control modulation of spatial light modulator 2115, if present, is calculated based on user selection.

In the examples we have been considering so far, a multi-processor system 115 configures the lighting device 11 to provide light output from the image display device 119 and to operate the controllable lighting system 111 to provide general illumination that substantially emulates a lighting distribution of a selected one of a number of types of luminaire, based on the lighting device configuration information.

As described herein, a software configurable lighting device 11 (e.g. FIG. 1) of the type described herein can store configuration information for one or more luminaire output distributions. A user may define the parameters of a distribution in the lighting device 11, for example, via a user interface on a controller or user terminal (e.g. mobile device or computer) in communication with the software configurable lighting device 11. In another example, the user may select or design a distribution via interaction with a server, e.g. of a virtual luminaire store; and the server communicates with the software configurable lighting device 11 to download the configuration information for the selected/designed distribution into the lighting device 11. When the software configurable lighting device 11 stores configuration information for a number of lighting distributions, the user operates an appropriate interface to select amongst the distributions available in the software configurable lighting device 11. Selections can be done individually by the user from time to time or in an automatic manner selected/controlled by the user, e.g. on a user's desired schedule or in response to user selected conditions such as amount of ambient light and/or number of occupants in an illuminated space.

Figure 2A:
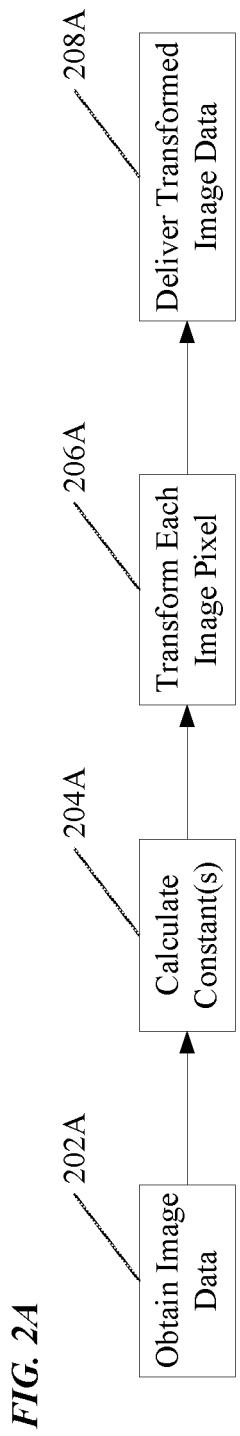
FIG. 2A is an example of a high-level process flow involved in a transformation of image data.
Figure 2B:
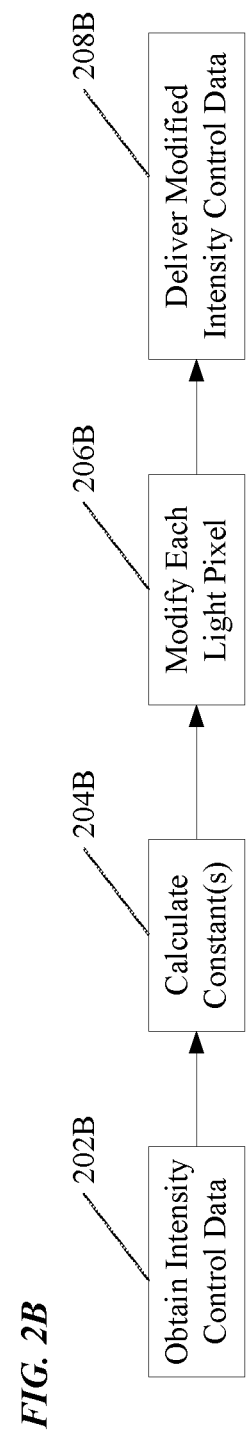
FIG. 2B is an example of a high-level process flow involved in a modification of control data.
Figure 2C:
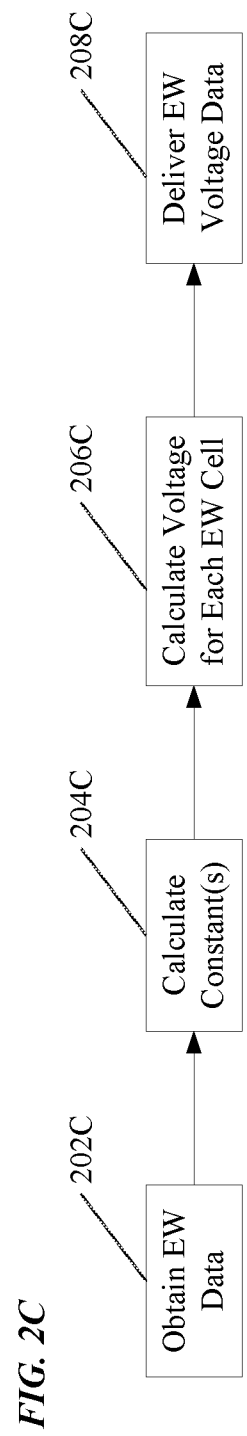
FIG. 2C is an example of a high-level process flow involved in a calculation of optical spatial modulation control data, e.g. for a luminaire configuration using an electrowetting cell array to implement the optical spatial modulation.

Of particular note, due to the additive nature of light, the contribution of an image to be displayed, without transformation, and the contribution of general illumination to be generated, without modification, may produce an undesirable result. More specifically, light generated by controllable lighting system 111 and intended for general illumination, without modification, may tend to "wash out" any image displayed by image display device 119. Likewise, light generated by image display device 119, without transformation, may tend to change a color characteristics distribution of the general illumination generated by controllable lighting system 111 (e.g., an intended "white" light may not appear "white"). As such, an approach is needed to compensate for each contribution made within the combined lighting device 131. In addition, any data necessary to control spatial modulation of generated general illumination light needs to be calculated. FIGS. 2A-2C depict high level examples of general process flows utilized to perform image data transformations, control data modifications and/or modulation data calculations in a software configurable lighting device. Further details regarding the process flows of FIGS. 2A-2C are described in commonly owned U.S. patent application entitled "Enhancements of a Transparent Display to Form a Software Configurable Luminaire," the entire disclosure of which is incorporated herein by reference.

FIG. 2A depicts a high level example of a process flow utilized to transform image data. In step 202A, image data is obtained. Based on the obtained image data, one or more constants is calculated in step 204A. The one or more constants include, for example, a sum of pixel colors, an average image brightness and/or a darkest color of the image. Each portion of image data corresponding to an image pixel, in step 206A, is transformed. In one example, the transformation is based on the one or more constants calculated in step 204A. Transformed image data, in step 208A, is delivered, for example, to storage/memories 125 and/or driver system 113.

FIG. 2B depicts a high level example of a process flow utilized to modify general illumination control data, such as data controlling intensity of general illumination to be generated by general illumination device 110. In step 202B, intensity control data is obtained. Based on the obtained control data, one or more constants is calculated in step 204B. The one or more constants include, for example, a minimum amount of lighting output to be produced, a maximum amount of lighting output to be produced and/or a target amount of lighting output to be produced. Each portion of control data corresponding to an illumination pixel, in step 206B, is modified. In one example, the modification is based on the one or more constants calculated in step 204B. Modified control data, in step 208B, is delivered, for example, to storage/memories 125 and/or driver system 113.

FIG. 2C depicts a high level example of a process flow utilized to calculate data necessary to control optical spatial modulation, such as might be performed by spatial light modulator 2115. In step 202C, modulation data is obtained. Based on the obtained modulation data, one or more constants is calculated in step 204C. The one or more constants include, for example, lens focal length and beam steering angle. Spatial light modulation is performed, for example, by an array of modulators, where each modulator corresponds to an illumination pixel. Hence, in step 206C, modulation control is calculated for each array cell based, for example, on the obtained modulation data and the one or more calculated constants. In one example where spatial light modulator 2115 is an array of electro-wetting (EW) cells, a necessary control voltage is calculated for each EW cell in step 206C. Calculated modulation control data, in step 208C, is delivered, for example, to storage/memories 125 and/or driver system 113.

As can be seen from FIGS. 2A-2C, each of the process flows, while performing different functions (e.g., image transformation, control data modification, modulation data calculation), shares common steps (e.g., constant calculation (s) and per pixel/cell data transformation/modification/calculation). Of note, the common step of calculating one or more constants involves, for example, performing one or more serialized tasks. That is, each constant is calculated, for example, using a different formula and hence, each constant is calculated separately. Of further note, the common step of transforming/modifying/calculating per pixel/cell data involves, for example, performing the same operation a plurality of times corresponding to the number of pixels/cells to be manipulated. That is, each portion of data corresponding to each pixel/cell is manipulated, for example, in the same fashion and hence, all data portions are manipulated during the same processing cycle (e.g., the plurality of operations are performed in parallel).

The serialized tasks to be performed by the common calculate constant(s) steps 204A-C are well suited to be performed by a processor such as microprocessor 123. Said another well, since microprocessor 123 is configured to perform multiple tasks in serial, serialized tasks such as those performed in steps 204A-C can efficiently be performed by such a processor. However, the plurality of operations to be performed in parallel as part of steps 206A-C are not well suited for such a serialized processor. Instead, steps 206A-C can more efficiently be performed by a parallel processor, such as parallel processor 143. Thus, the multi-processor system 115 of FIG. 1 represents an improved host processing system for inclusion in a software configurable luminaire.

Given multi-processor system 115, for example, multiple approaches exist for managing distribution of tasks between microprocessor 123 and parallel processor 143. FIGS. 3A-3D depict high level examples of process flows utilized in managing task distribution. In one example, depicted in FIG. 3A, serialized tasks, including calculating one or more constants, are performed by the CPU in step 302A and a plurality of operations, including per pixel/cell transformations/modifications/modulation data calculations, are performed in parallel by the parallel processor in step 304A.

Figure 3A:
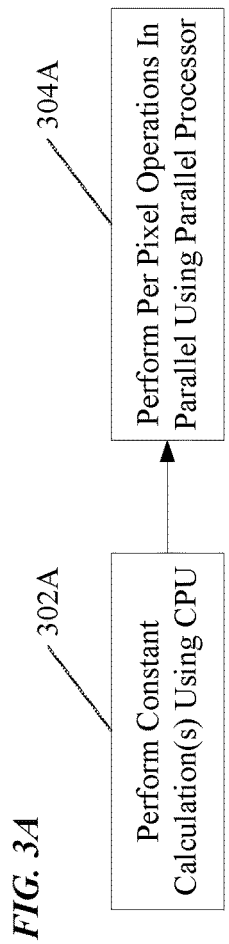
Figure 3B:
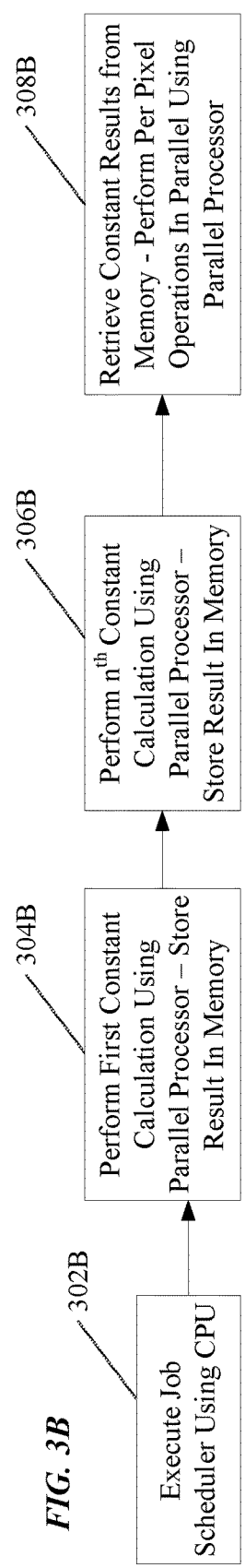

In another example, depicted in FIG. 3B, the CPU executes a job scheduler in step 302B. Under control of the job scheduler executing by the CPU, parallel processor performs a first serialized task and stores a result in memory during step 304B. Although not shown, parallel processor may perform a number of serialized tasks, one after another. In step 306B, parallel processor performs an $n^{th}$ serialized task and stores the corresponding result in memory. Once all serialized tasks have been performed, parallel processor, in step 308B, retrieves the stored results from memory and performs a plurality of operations in parallel. Of note, in the example of FIG. 3B, parallel processor performs both the serialized tasks, under control of the CPU, and the plurality of operations.

In a further example, depicted in FIG. 3C, CPU includes multiple cores or otherwise supports multiple processing threads. Of note, such multi-core or otherwise multi-threaded processor is able to execute multiple tasks, or threads, simultaneously. As such, in step 302C, CPU executes a thread scheduler using one core or thread. Based on the executing thread scheduler, other cores, or threads, each perform one serialized task. Such simultaneous performance of multiple serialized tasks is depicted in steps 304Ca-n. As each serialized task is completed, results are delivered to the parallel processor. In step 306C, parallel processor receives the results of the serialized tasks and, once all serialized tasks are completed, performs a plurality of operations in parallel. For example, parallel processor receives all constants necessary to transform image data and, based on the received constants, performs each per image pixel transformation in parallel such that the entire image data is transformed during the same processing cycle.

In yet another example, depicted in FIG. 3D, a multi-core or otherwise multi-threaded CPU executes a thread scheduler using one core or thread for control of serialized tasks performed by other cores or threads of the CPU and then executes a job scheduler using the one core or thread for control of the plurality of operations to be performed by the parallel processor. In this example, the thread scheduler is executed in one core or thread as part of step 302Da. In turn, the thread scheduler manages performance of serialized tasks by other cores or threads during steps 304Da-n. Results of the serialized tasks, in step 306D, are stored in memory. Once serialized tasks are completed and the thread scheduler finishes, the one core or thread then executes a job scheduler, in step 302Db, to manage the plurality of operations to be performed by the parallel processor. Based on the executing job scheduler, parallel processor, in step 308D, retrieves the results from memory and performs the plurality of operations in parallel.

As can be seen in FIGS. 3A-3D, various approaches exist to manage performance of serialized tasks and parallel operations in a multi-processor system such as multi-processor system 115. In addition, the data to be manipulated (e.g., image data, control data, modulation data) may be stored and referenced in a number of different ways. In particular, image data and control data may be interlaced or otherwise intermixed within a single set of data, such as data within a single portion of memory. Alternatively, image data may be maintained separately from control data or modulation data (i.e., image data in one portion of memory, control data in another portion of memory, and modulation data in yet a different portion of memory), yet managed in an integrated fashion. FIGS. 4-7 depict examples of different representations of data to be utilized in a software configurable luminaire.

Before discussing the specific examples of FIGS. 4-7, it may be helpful to review typical structures for image data and control data. In general, an image may be viewed as a collection of image pixels, where each image pixel projects a particular color. The color to be projected by a particular image pixel is often defined as a combination of primary colors, most often red (R), green (G) and blue (B); although other combinations exists, such as cyan (C), magenta (M), yellow (Y) and black (K). Thus, one image pixel may be defined by an RGB value representing an amount of R, an amount of G and an amount of B to be combined. Similarly, an array of emitters to generate general illumination may also be viewed as a collection of illumination pixels, where each illumination pixel projects a particular chromaticity with a specified intensity. Although chromaticity may be perceived as a particular color, chromaticity is often defined as a coordinate on an x,y color coordinate system. Hence, an illumination pixel may be defined by an xyY value representing chromaticity (i.e., xy) and intensity (i.e., Y). Alternatively or in addition, given "white" or other "single color" emitters, intensity data may be sufficient to drive general illumination generation in a software configurable luminaire.

As can be seen, even though an image pixel and an illumination pixel may each be defined based on a different interpretation of data, the underlying data may be represented in an otherwise "common" format. That is, each pixel, whether image or illumination, may be defined by a collection of data points and, for a series of pixels, each series of like data points forms a channel (e.g., an R/x channel, a G/y channel and a B/Y channel). As such, the examples depicted in FIGS. 4-7 define the number and/or nature of individual channels utilized to manage and/or manipulate data in a software configurable luminaire. Of further note, the various channels, in one example, are represented as a string of values in a one-dimensional array (e.g., $R_1, G_1, B_1, R_2, G_2, B_2 \ldots R_n, G_n, B_n$).

Figure 4:
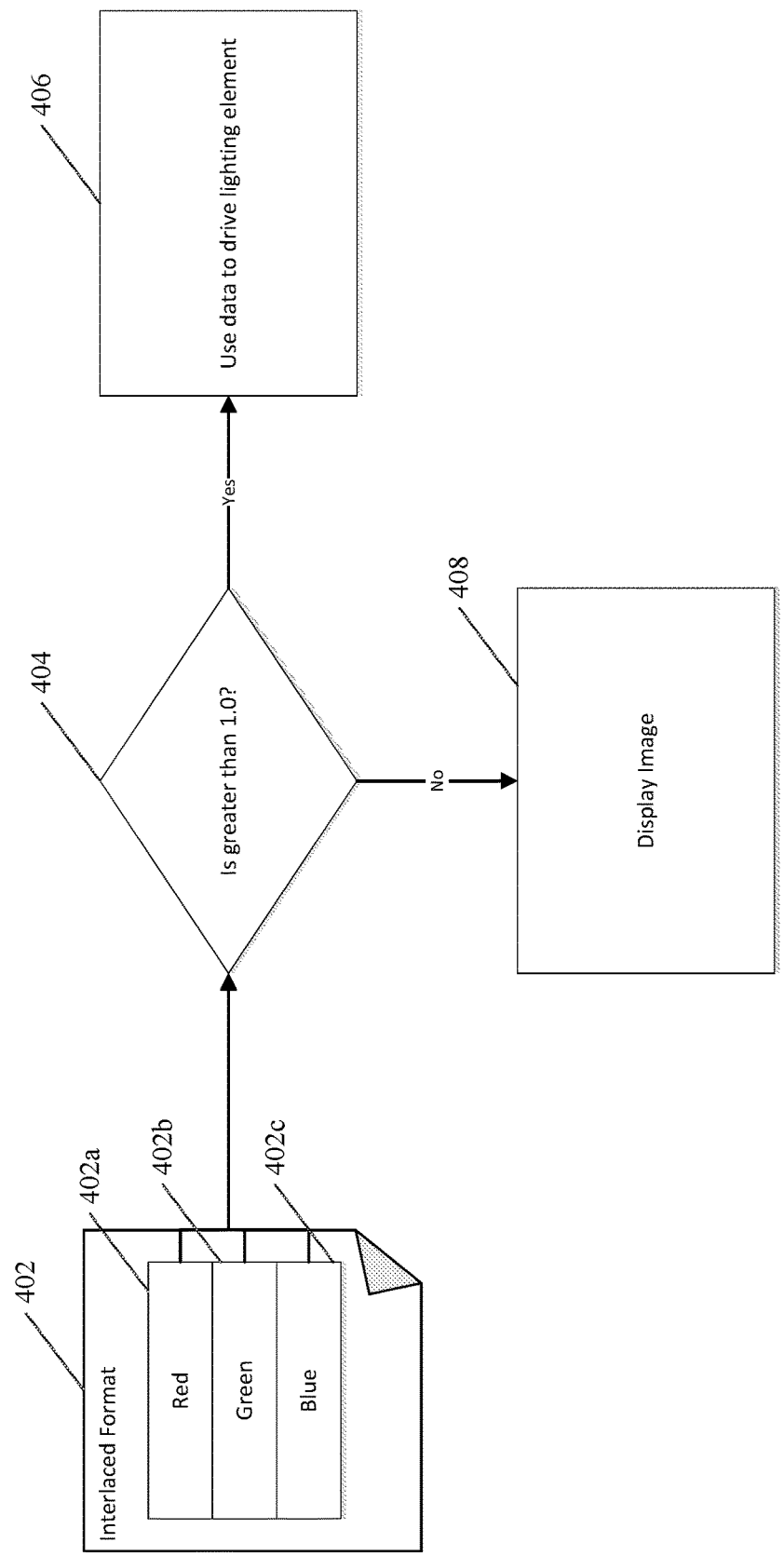

FIG. 4 depicts one example of an approach to manage data to be utilized in a software configurable luminaire. In this example, three channels are utilized to represent the data, with each channel including a series of 16-bit floating point values. At 402, control data and image data are maintained in an interlaced fashion. For example, the first channel includes a series of values representing R, the second channel includes a series of values representing G and the third channel includes a series of values representing B. In order to define a pixel, either image or illumination, one value is taken from each of the three channels (i.e., a set of RGB values). In 404, the set of three values taken from the three channels is evaluated. If the three values are each less than 1, then the three values correspond to an image pixel in 408. Otherwise, the three values correspond to an illumination pixel in 406. Although not explicitly shown, each set of three RGB values contained in the three channels is evaluated to determine whether the set corresponds to an image pixel or an illumination pixel. In this way, RGB values corresponding to image pixels and RGB values corresponding to illumination pixels are interlaced throughout the three channels.

Figure 5:
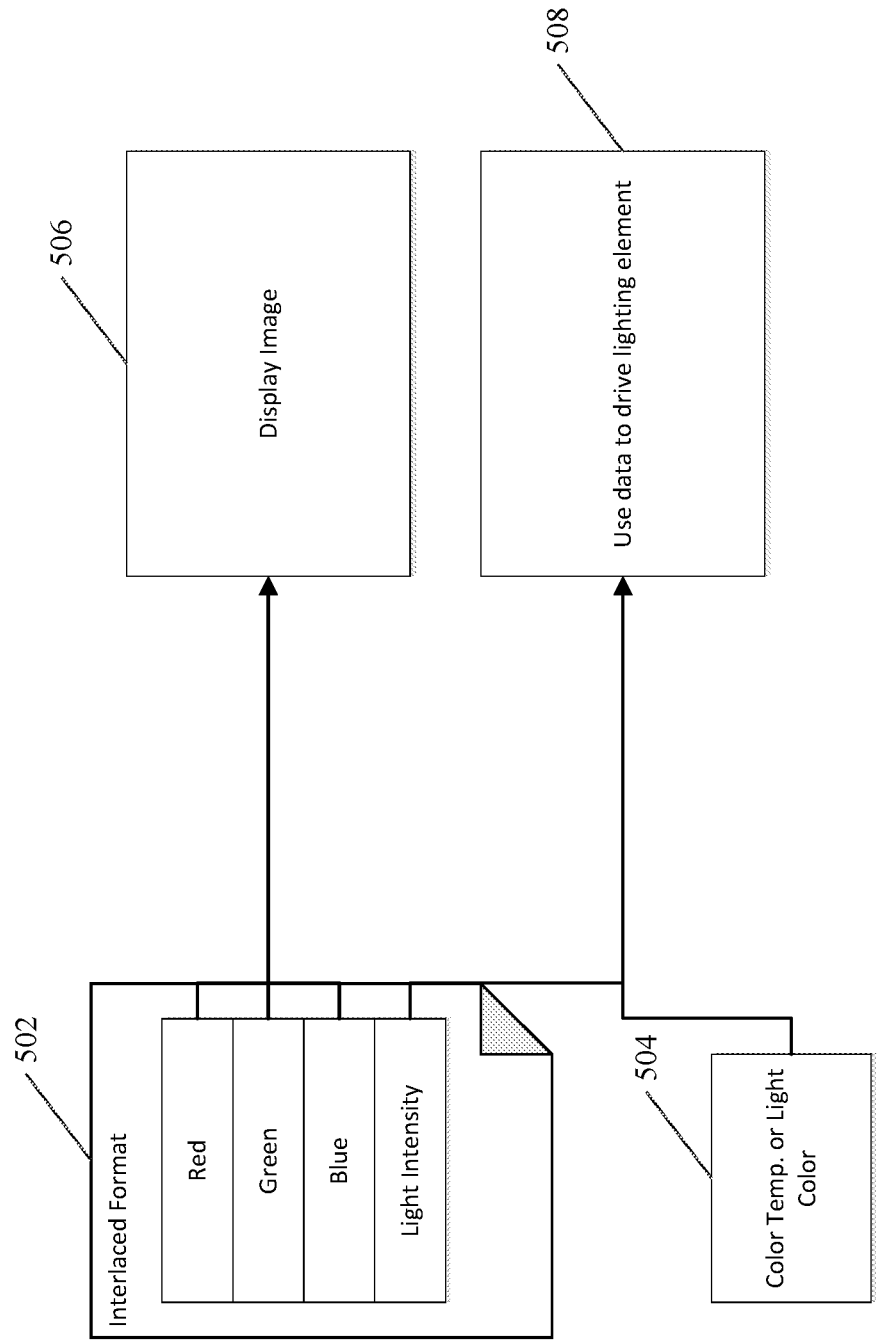

FIG. 5 depicts another example of an approach to manage data to be utilized in a software configurable luminaire. In this other example, four channels are utilized to represent some portion of the data, with each channel including a series of 16-bit floating point values. However, unlike the approach of FIG. 4 where data corresponding to an image pixel is intermixed within the same channels as data corresponding to an illumination pixel, three of the channels at 502 correspond exclusively to RGB values representing image data displayed at 506 while one channel at 502 corresponds to intensity data for use in general illumination generation at 508. In one example, the four channels of interlaced data at 502 is represented as a one-dimensional array of values (e.g., $R_1, G_1, B_1, I_1, R_2, G_2, B_2, I_2 \ldots R_n, G_n, B_n, I_n$). Separately, color temperature or light color data is maintained, at 504, for use in general illumination generation at 508.

FIG. 6 depicts yet another example of an approach to manage data to be utilized in a software configurable luminaire. For example, two channels are utilized to represent some portion of the data, with each channel including a series of 16-bit floating point values. In this example, image data is maintained separately at 606 to be displayed at 608. At 602, one channel includes color temperature data and the other channel includes light intensity data for use in general illumination generation at 604. As such, only data corresponding to illumination pixels is interlaced within a single data set. However, as with the examples of FIGS. 4-5 and 7, the two channels of interlaced data at 602, for example, is represented as a one-dimensional array of values (e.g., $C_1, I_1, C_2, I_2 \ldots C_n, I_n$).

FIG. 7 depicts a further example of an approach to manage data to be utilized in a software configurable luminaire. Similar to the example of FIG. 6, image data is maintained separately at 706 for display at 708. Unlike the example of FIG. 6, three channels are utilized to represent red intensity, blue intensity and green intensity at 702 for use in generating general illumination at 704. The three channels of intensity data are represented, for example, as a one-dimensional array of values.

Figure 10:
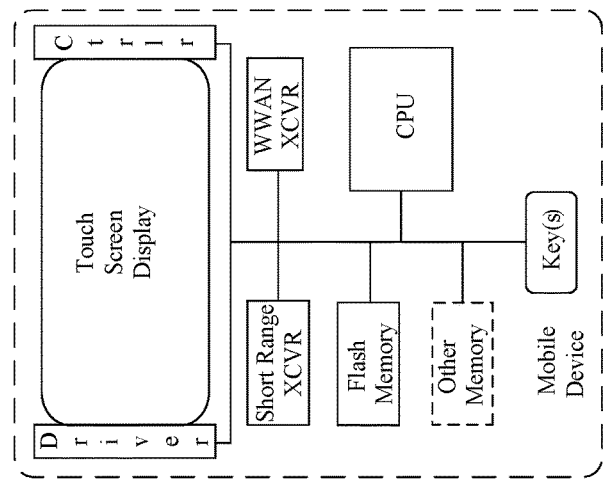
FIG. 10 is a simplified functional block diagram of a mobile device, as an alternate example of a user terminal device, for possible communication with a software configurable luminaire.
Figure 9:
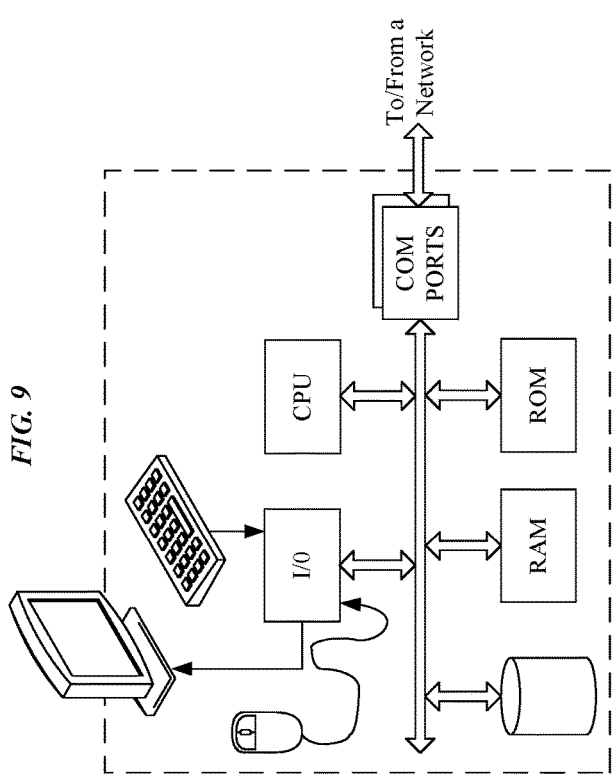
FIG. 9 is a simplified functional block diagram of a personal computer or other similar user terminal device, which may communicate with a software configurable luminaire.
Figure 8:
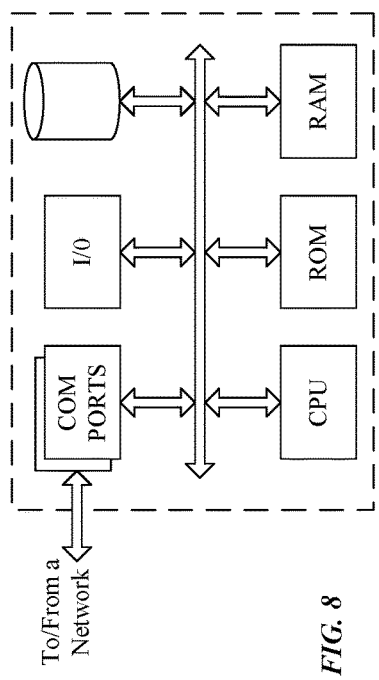
FIG. 8 is a simplified functional block diagram of a computer that may be configured as a host or server, for example, to supply image selection and/or general illumination generation selection to a software configurable luminaire, such as that of FIG. 1.

As shown by the above discussion, although many intelligent processing functions are implemented in lighting device, at least some functions may be implemented via communication with general purpose computers or other general purpose user terminal devices, although special purpose devices may be used. FIGS. 8-10 provide functional block diagram illustrations of exemplary general purpose hardware platforms.

FIG. 8 illustrates a network or host computer platform, as may typically be used to generate and/or receive lighting device 11 control commands, including data related to operation of the configurable luminaire, and access networks and devices external to the lighting device 11, such as multi-processor system 115 of FIG. 1 or implement light generation and control functionality of driver system 113. FIG. 9 depicts a computer with user interface communication elements, such as 117 as shown in FIG. 1, although the computer of FIG. 9 may also act as a server if appropriately programmed. The block diagram of a hardware platform of FIG. 10 represents an example of a mobile device, such as a tablet computer, smartphone or the like with a network interface to a wireless link, which may alternatively serve as a user terminal device for providing a user communication with a lighting device, such as 11. It is believed that those skilled in the art are familiar with the structure, programming and general operation of such computer equipment and as a result the drawings should be self-explanatory.

A server (see e.g. FIG. 8), for example, includes a data communication interface for packet data communication via the particular type of available network. The server also includes a central processing unit (CPU), in the form of one or more processors, for executing program instructions. The server platform typically includes an internal communication bus, program storage and data storage for various data files to be processed and/or communicated by the server, although the server often receives programming and data via network communications. The hardware elements, operating systems and programming languages of such servers are conventional in nature, and it is presumed that those skilled in the art are adequately familiar therewith. Of course, the server functions may be implemented in a distributed fashion on a number of similar platforms, to distribute the processing load. A server, such as that shown in FIG. 8, may be accessible or have access to a lighting device 11 via the communication interfaces 117 of the lighting device 11. For example, the server may deliver in response to a user request a configuration information file. The information of a configuration information file may be used to configure a software configurable lighting device, such as lighting device 11, to set light output parameters comprising: (1) light intensity, (2) light color characteristic and (3) spatial modulation, in accordance with the lighting device configuration information. In some examples, the lighting device configuration information include an image for display by the lighting device and at least one level setting for at least one of beam steering or beam shaping by the lighting device. The configuration information file may also include information regarding the performance of the software configurable lighting device, such as dimming performance, color temperature performance and the like. The configuration information file may also include temporal information such as when to switch from one beam shape or displayed image to another and how long the transition from one state to another should take. Configuration data may also be provided for other states, e.g., for when the virtual luminaire is to appear OFF, in the same or a separate stored data file.

A computer type user terminal device, such as a desktop or laptop type personal computer (PC), similarly includes a data communication interface CPU, main memory (such as a random access memory (RAM)) and one or more disc drives or other mass storage devices for storing user data and the various executable programs (see FIG. 9). A mobile device (see FIG. 10) type user terminal may include similar elements, but will typically use smaller components that also require less power, to facilitate implementation in a portable form factor. The example of FIG. 10 includes a wireless wide area network (WWAN) transceiver (XCVR) such as a 3G or 4G cellular network transceiver as well as a short range wireless transceiver such as a Bluetooth and/or WiFi transceiver for wireless local area network (WLAN) communication. The computer hardware platform of FIG. 8 and the terminal computer platform of FIG. 9 are shown by way of example as using a RAM type main memory and a hard disk drive for mass storage of data and programming, whereas the mobile device of FIG. 10 includes a flash memory and may include other miniature memory devices. It may be noted, however, that more modern computer architectures, particularly for portable usage, are equipped with semiconductor memory only.

The various types of user terminal devices will also include various user input and output elements. A computer, for example, may include a keyboard and a cursor control/selection device such as a mouse, trackball, joystick or touchpad; and a display for visual outputs (see FIG. 9). The mobile device example in FIG. 10 uses a touchscreen type display, where the display is controlled by a display driver, and user touching of the screen is detected by a touch sense controller (Ctrlr). The hardware elements, operating systems and programming languages of such computer and/or mobile user terminal devices also are conventional in nature, and it is presumed that those skilled in the art are adequately familiar therewith.

The user device of FIG. 9 and the mobile device of FIG. 10 may also interact with the lighting device 11 in order to enhance the user experience. For example, third party applications stored as programs 127 may correspond to control parameters of a software configurable lighting device, such as image display and general illumination lighting distribution. In addition in response to the user controlled input devices, such as I/O of FIG. 9 and touchscreen display of FIG. 10, the lighting device, in some examples, is configured to accept input from a host of sensors, such as sensors 121. These sensors may be directly tied to the hardware of the device or be connected to the platform via a wired or wireless network. For example, a daylight sensor may be able to affect the light output from the illumination piece of the platform and at the same time change the scene of display as governed by the algorithms associated with the daylight sensor and the lighting platform. Other examples of such sensors can be more advanced in their functionality such as cameras for occupancy mapping and situational mapping.

The lighting device 11 in other examples is configured to perform visual light communication. Because of the beam steering (or steering) capability, the data speed and bandwidth can have an increased range. For example, beam steering and shaping provides the capability to increase the signal-to-noise ratio (SNR), which improves the visual light communication (VLC). Since the visible light is the carrier of the information, the amount of data and the distance the information may be sent may be increased by focusing the light. Beam steering allows directional control of light and that allows for concentrated power, which can be a requirement for providing highly concentrated light to a sensor. In other examples, the lighting device 11 is configured with programming that enables the lighting device 11 to "learn" behavior. For example, based on prior interactions with the platform, the lighting device 11 will be able to use artificial intelligence algorithms stored in memory 125 to predict future user behavior with respect to a space.

As also outlined above, aspects of the techniques for operation of a software configurable lighting device and any system interaction therewith, may involve some programming, e.g. programming of the lighting device, e.g. programming executing on the multi-processor system in the luminaire to implement the data processing functions to drive the display and light source as discussed above. Programming aspects may also include programming for a server or terminal device in communication with the lighting device. For example, the mobile device of FIG. 10 and the user device of FIG. 9 may interact with a server, such as the server of FIG. 8, to obtain a configuration information file, including data related to operation of the configurable luminaire (e.g., image data, illumination control data and/or modulation data), that may be delivered to a software configurable lighting device 11. Subsequently, the mobile device of FIG. 10 and/or the user device of FIG. 9 may execute programming that permits the respective devices to interact with the software configurable lighting device 11 to provide control commands such as the ON/OFF command or a performance command, such as dim or change beam steering angle or beam shape focus.

Program aspects of the technology discussed above therefore may be thought of as "products" or "articles of manufacture" typically in the form of executable code and/or associated data (software or firmware) that is carried on or embodied in a type of machine readable medium. "Storage" type media include any or all of the tangible memory of the luminaries, computers, processors or the like, or associated modules thereof, such as various semiconductor memories, tape drives, disk drives and the like, which may provide non-transitory storage at any time for the software or firmware programming. All or portions of the programming may at times be communicated through the Internet or various other telecommunication networks. Such communications, for example, may enable loading of the software from one computer or processor into another, for example, from a management server or host computer of the lighting system service provider into any of the lighting devices, sensors, user interface devices, other non-lighting-system devices, etc. of or coupled to the system 11 via communication interfaces 117, including both programming for individual element functions and programming for distributed processing functions. Thus, another type of media that may bear the software/firmware program elements includes optical, electrical and electromagnetic waves, such as used across physical interfaces between local devices, through wired and optical landline networks and over various air-links. The physical elements that carry such waves, such as wired or wireless links, optical links or the like, also may be considered as media bearing the software. As used herein, unless restricted to non-transitory, tangible or "storage" media, terms such as computer or machine "readable medium" refer to any medium that participates in providing instructions to a processor for execution.

The term "coupled" as used herein refers to any logical, physical or electrical connection, link or the like by which signals produced by one system element are imparted to another "coupled" element. Unless described otherwise, coupled elements or devices are not necessarily directly connected to one another and may be separated by intermediate components, elements or communication media that may modify, manipulate or carry the signals.

It will be understood that the terms and expressions used herein have the ordinary meaning as is accorded to such terms and expressions with respect to their corresponding respective areas of inquiry and study except where specific meanings have otherwise been set forth herein. Relational terms such as first and second and the like may be used solely to distinguish one entity or action from another without necessarily requiring or implying any actual such relationship or order between such entities or actions. The terms "comprises," "comprising," "includes," "including," or any other variation thereof, are intended to cover a non-exclusive inclusion, such that a process, method, article, or apparatus that comprises a list of elements does not include only those elements but may include other elements not expressly listed or inherent to such process, method, article, or apparatus. An element preceded by "a" or "an" does not, without further constraints, preclude the existence of additional identical elements in the process, method, article, or apparatus that comprises the element.

Unless otherwise stated, any and all measurements, values, ratings, positions, magnitudes, sizes, and other specifications that are set forth in this specification, including in the claims that follow, are approximate, not exact. They are intended to have a reasonable range that is consistent with the functions to which they relate and with what is customary in the art to which they pertain.

While the foregoing has described what are considered to be the best mode and/or other examples, it is understood that various modifications may be made therein and that the subject matter disclosed herein may be implemented in various forms and examples, and that they may be applied in numerous applications, only some of which have been described herein. It is intended by the following claims to claim any and all modifications and variations that fall within the true scope of the present concepts.

What is claimed is:

1. A configurable luminaire, comprising:
   a display configured to present an image;
   a controllable, general illumination, light source collocated with the display;
   a driver system coupled to the display and the light source, the driver system being configured to:
      supply drive power to the light source in a manner to control general illumination light output by the light source; and
      control presentation of the image via the display; and
   a multi-processor system coupled to the driver system, the multi-processor system comprising a central processing unit and a parallel processing unit, wherein:
      the multi-processor system is configured to obtain data related to operation of the configurable luminaire;
      the central processing unit is configured to perform a calculation based on the obtained data;
      the parallel processing unit is configured to perform a plurality of operations in parallel,
         each operation corresponding to a portion of the obtained data;
         each operation comprising at least one task to be performed based on the corresponding portion of the obtained data and a result of the calculation performed by the central processing unit; and
         the plurality of operations result in modified data; and
      the multi-processor system is further configured to control operation of the driver system, based on the modified data, including to: (1) control light generated by the light source and (2) control the presentation of the image via the display.

2. The configurable luminaire of claim 1, further comprising:
   a memory accessible to the multi-processor system; and
   programming in the memory, wherein execution of the programming by the multi-processor system configures the multi-processor system to perform the functions.

3. The configurable luminaire of claim 1, wherein the parallel processing unit comprises a graphical processing unit, a field programmable gate array or an application specific integrated circuit.

4. The configurable luminaire of claim 1, wherein:
   the obtained data includes image pixel data representing points of the image;

the plurality of operations result in a transformation of the image data; and the parallel processing unit is further configured to perform the plurality of operations in parallel such that the transformation of the image data occurs during a same processing period.

5. The configurable luminaire of claim 1, wherein:
the obtained data includes control data controlling an intensity of general illumination light output at each of a plurality of pixels of output by the light source;
the plurality of operations result in a modification of the intensity of general illumination light output at a number of the pixels output of the light source; and
the parallel processing unit is further configured to perform the plurality of operations in parallel such that the modification of the control data occurs during a same processing period.

6. The configurable luminaire of claim 1, wherein:
the obtained data includes image pixel data representing points of the image and control data controlling an intensity of general illumination light output at each of a plurality of pixels of output by the light source;
a first plurality of the operations result in a transformation of data for a number of pixels of the image data;
a second plurality of the operations result in a modification of the intensity of general illumination light output at a number of the pixels output of the light source; and
the parallel processing unit is further configured to:
perform the first plurality of operations in parallel such that the transformation of the image data occurs during a same first processing period; and
perform the second plurality of operations in parallel such that the modification of the control data occurs during a same second processing period.

7. The configurable luminaire of claim 1, further comprising a spatial light modulator located between the display and the light source, wherein:
the obtained data includes modulation data for controlling the spatial light modulator;
the plurality of operations result in a modification of the modulation data; and
the parallel processing unit is further configured to perform the plurality of operations in parallel such that the modification of the control data occurs during a same processing period.

8. The configurable luminaire of claim 7, wherein:
the spatial light modulator comprises an electro-wetting cell array,
the modulation data includes a first control setting value for each respective cell of the array,
the modified modulation data includes a second control setting value for each respective cell of the array, and
a plurality of the second control setting values are modified from and therefore different from corresponding first control setting values for respective cells of the array.

9. The configurable luminaire of claim 1, wherein:
for each operation the corresponding portion of the obtained data represents a respective pixel; and
the parallel processing unit is further configured to:
obtain at least one constant related to the obtained data;
receive the obtained data; and
perform the plurality of operations in parallel such that all portions of the obtained data are modified during one same processing period, the at least one task of each operation including modifying the portion of the obtained data corresponding to the respective pixel based on the at least one constant.

10. The configurable luminaire of claim 9, wherein:
the calculation includes calculating the at least one constant related to the obtained data; and
the central processing unit is further configured to deliver the at least one constant to the parallel processing unit.

11. The configurable luminaire of claim 9, further comprising a memory accessible to the multi-processor system, wherein:
the calculation includes calculating a job schedule for control of the parallel processing unit; and
the central processing unit is further configured to:
control, based on the job schedule, the parallel processing unit to perform at least two serial tasks, wherein:
each of the at least two serial tasks is performed in series such that only one serial task is performed during each processing period; and
each of the at least two serial tasks includes calculating a respective constant related to the obtained data; and
upon completion of the at least two serial tasks, control the parallel processing unit to perform the plurality of operations in parallel using the constants.

12. The configurable luminaire of claim 1, further comprising a memory accessible to the multi-processor system, wherein:
the central processing unit comprises a plurality of processing cores;
the calculation includes calculating, by one of the plurality of processing cores, a thread schedule for control of the other processing cores;
the central processing unit is further configured to:
control, based on the thread schedule, at least two other processing cores, wherein:
each of the at least two other processing cores manages a respective thread including calculating a respective constant related to the obtained data; and
each of the at least two other processing cores manages the respective thread during a same processing period; and
after the same processing period, deliver the calculated constants to the parallel processing unit.

13. The configurable luminaire of claim 1, further comprising a memory accessible to the multi-processor system, wherein:
the central processing unit comprises a plurality of processing cores;
the calculation includes:
calculating, by one of the plurality of processing cores, a thread schedule for control of the other processing cores; and
calculating, by the one processing core, a job schedule for control of the parallel processing unit; and
the central processing unit is further configured to:
control, based on the thread schedule, at least two other processing cores, wherein:
each of the at least two other processing cores manages a respective thread including calculating a respective constant related to the obtained data; and
each of the at least two other processing cores manages the respective thread during a same processing period;

after the same processing period, store the calculated constants in the memory; and control, based on the job schedule, the parallel processing unit to perform the plurality of operations in parallel using the stored constants.

14. The configurable luminaire of claim 1, wherein the controllable, general illumination, light source and the display are collocated to allow passage of general illumination light output from the light source and image light output from the display through a common output area or surface of the configurable luminaire.

15. A method, comprising:

obtaining, by a multi-processor system of a configurable luminaire, data related to operation of the configurable luminaire;

performing, by a central processing unit of the multi-processor system, a calculation based on the obtained data;

performing, by a parallel processing unit of the multi-processor system, a plurality of operations in parallel, each operation corresponding to a portion of the obtained data;

each operation comprising at least one task to be performed based on the corresponding portion of the obtained data and a result of the calculation performed by the central processing unit; and the plurality of operations resulting in modified data; and controlling, by the multi-processor system, operation of a driver system of the configurable luminaire, based on the modified data, including to: (1) control light generated by a light source of the configurable luminaire and (2) control the presentation of an image via a display of the configurable luminaire.

16. The method of claim 15, wherein:

the obtaining step includes obtaining image pixel data representing points of the image, each portion of the image data corresponding to a respective pixel of the image; and the step of performing the plurality of operations comprises transforming each respective pixel in parallel such that the transformation of the image data occurs in a same processing period.

17. The method of claim 15, wherein:

the obtaining step includes obtaining control data controlling the intensity of general illumination light output at each of a plurality of pixels of output by the light source, each portion of the control data corresponding to a respective pixel of the light source; and the step of performing the plurality of operations comprises modifying an intensity of each respective pixel in parallel such that the modification of the control data occurs in a same processing period.

18. The method of claim 15, wherein:

the obtaining step includes:

obtaining image pixel data representing points of the image, each portion of the image data corresponding to a respective pixel of the image; and obtaining control data controlling the intensity of general illumination light output by the light source, each portion of the control data corresponding to a respective pixel of the light source; and the step of performing the plurality of operations comprises:

during one processing period, transforming each portion of the image data corresponding to each respective pixel of the image in parallel such that the transformation of the image data occurs during the one processing period; and during another processing period, modifying each portion of the control data corresponding to each respective pixel of the light source in parallel such that the modification of the control data occurs during the other processing period.

19. The method of claim 15, wherein:

for each operation the corresponding portion of the obtained data represents a respective pixel; and the step of performing the plurality of operations comprises:

obtaining at least one constant related to the obtained data;

receiving the obtained data; and performing the plurality of operations in parallel such that all portions of the obtained data are modified during a same processing period, the at least one task of each operation including modifying the portion of the obtained data corresponding to the respective pixel based on the at least one constant.

20. The method of claim 19, wherein the step of performing the calculation comprises:

calculating the at least one constant related to the obtained data; and delivering the at least one constant to the parallel processing unit.

21. The method of claim 19, wherein:

the step of performing the calculation comprises:

calculating a job schedule for control of the parallel processing unit; and controlling, based on the job schedule, the parallel processing unit to perform at least two serial tasks, wherein:

each of the at least two serial tasks is performed in series such that only one serial task is performed during each processing period; and each of the at least two serial tasks includes calculating a respective constant related to the obtained data.

22. The method of claim 19, wherein the step of performing the calculation comprises:

calculating, by one of a plurality of processing cores of the central processing unit, a thread schedule for control of the other processing cores;

controlling, based on the thread schedule, at least two other processing cores, wherein:

each of the at least two other processing cores manages a respective thread including calculating a respective constant related to the obtained data; and each of the at least two other processing cores manages the respective thread during a same processing period; and after the same processing period, delivering the calculated constants to the parallel processing unit.

23. The method of claim 19, wherein the step of performing the calculation comprises:

calculating, by one of a plurality of processing cores of the central processing unit, a thread schedule for control of the other processing cores;

calculating, by the one processing core, a job schedule for control of the parallel processing unit;

controlling, based on the thread schedule, at least two other processing cores, wherein:

each of the at least two other processing cores manages a respective thread including calculating a respective constant related to the obtained data; and each of the at least two other processing cores manages the respective thread during a same processing period;

after the same processing period, storing the calculated constants in the memory; and controlling, based on the job schedule, the parallel processing unit to perform the plurality of operations in parallel.

24. The method of claim 15, wherein the light source and the display are collocated to allow passage of general illumination light output from the light source and image light output from the display through a common output area or surface of the configurable luminaire.

25. A configurable luminaire, comprising:

a transparent display configured to present an image;

a general illumination light source comprising an array of individually controllable light emitters collocated with the transparent display;

a driver system coupled to the transparent display and the light source, the driver system being configured to:

selectively supply drive power to the individually controllable light emitters of the light source in a manner to control general illumination light output by the light source; and control presentation of the image via the transparent display; and a multi-processor system coupled to control the driver system configured to obtain data related to operation of the configurable luminaire, the multi-processor system comprising:

a central processing unit configured to perform a calculation based on the obtained data; and a parallel processing unit configured to perform a plurality of operations in parallel, each operation corresponding to a portion of the obtained data;

each operation comprising at least one task to be performed based on the corresponding portion of the obtained data and a result of the calculation performed by the central processing unit; and the plurality of operations result in modified data; and wherein the multi-processor system is further configured to control operation of the driver system, based on the modified data, including to: (1) control light generated by the light source and (2) control the presentation of the image via the display.

26. The configurable luminaire of claim 25, further comprising:

a spatial light modulator coupled to the light source to controllably, spatially distribute general illumination light output from the source, wherein:

the driver system is further coupled to the spatial light modulator, and the driver system is further configured to control the distribution of the generated illumination light by the spatial light modulator.

27. The configurable luminaire of claim 25, further comprising a partial diffuser located on an output side of the transparent display.

28. The configurable luminaire of claim 25, wherein the general illumination light source and the transparent display are collocated to allow passage of general illumination light output from the general illumination light source and image light output from the transparent display through a common output area or surface of the configurable luminaire.

* * * * *